(12) United States Patent
Numao

(10) Patent No.: US 9,463,537 B2
(45) Date of Patent: Oct. 11, 2016

(54) WORKPIECE POSITIONING APPARATUS

(71) Applicant: Musashi Seimitsu Industry Co., Ltd., Toyohashi-shi, Aichi (JP)

(72) Inventor: Tsutomu Numao, Toyohashi (JP)

(73) Assignee: MUSASHI SEIMITSU INDUSTRY CO., LTD., Toyohashi-Shi (JP)

( * ) Notice: Subject to any disclaimer, the term of this patent is extended or adjusted under 35 U.S.C. 154(b) by 169 days.

(21) Appl. No.: 14/475,719

(22) Filed: Sep. 3, 2014

(65) Prior Publication Data

US 2015/0059165 A1  Mar. 5, 2015

(30) Foreign Application Priority Data

Sep. 4, 2013  (JP) ................. 2013-183254

(51) Int. Cl.
  *B25B 27/14* (2006.01)
  *B23P 19/02* (2006.01)

(52) U.S. Cl.
  CPC ............ *B23P 19/02* (2013.01); *B23P 2700/02* (2013.01); *Y10T 29/53078* (2015.01); *Y10T 29/53978* (2015.01)

(58) Field of Classification Search
  CPC ... B25B 11/04; B25B 27/28; B23K 37/0408; B60B 29/001
  See application file for complete search history.

(56) References Cited

U.S. PATENT DOCUMENTS

| | | | | |
|---|---|---|---|---|
| 4,763,394 A * | 8/1988 | Decato | ................... | B23P 19/02 29/252 |
| 6,059,277 A * | 5/2000 | Sawdon | ................... | B25B 5/16 269/24 |
| 7,188,832 B2 * | 3/2007 | Kita | ................... | B25B 5/16 269/24 |
| 7,618,028 B2 * | 11/2009 | Huisken | ................... | B23Q 3/18 269/63 |
| 7,686,286 B2 * | 3/2010 | Colby | ................... | B25B 5/087 269/24 |
| 8,132,801 B2 * | 3/2012 | Miyashita | ................... | B25B 5/087 269/228 |
| 8,132,802 B2 * | 3/2012 | Kolodge | ................... | G01B 11/2425 250/559.19 |
| 8,146,900 B2 * | 4/2012 | Miyashita | ................... | B23K 37/0435 269/228 |
| 8,387,222 B2 * | 3/2013 | Chen | ................... | B25B 27/02 269/314 |
| 8,550,444 B2 * | 10/2013 | Nygaard | ................... | G01B 11/2425 269/275 |
| 8,888,083 B2 * | 11/2014 | Hosaka | ................... | B23Q 11/001 269/55 |
| 2015/0059165 A1 * | 3/2015 | Numao | ................... | B23P 19/02 29/718 |

FOREIGN PATENT DOCUMENTS

JP  03-170235  7/1991

* cited by examiner

*Primary Examiner* — Lee D Wilson
(74) *Attorney, Agent, or Firm* — Rankin, Hill & Clark LLP

(57) ABSTRACT

For positioning a workpiece when a pin is to be press-fit, via a press-fitting device, into a pin hole formed in advance radially through the thickness of a cylindrical section of the workpiece, a workpiece positioning apparatus includes: a center axially movable toward the workpiece in such a manner that a distal end section of the center is introduced into the cylindrical section of the workpiece; and a projecting member accommodated in the center. With the distal end section of the center introduced in the cylindrical section of the workpiece, the projecting member projects through a through-hole of the center into engagement with the pin hole, and the projecting member is retracted from the pin hole when the pin is to be press-fitted into the pin hole.

4 Claims, 12 Drawing Sheets

WORKPIECE POSITIONING APPARATUS

FIELD OF THE INVENTION

The present invention relates generally to apparatus for positioning a workpiece when a pin is to be press-fitted into a workpiece by means of a press-fitting device.

BACKGROUND OF THE INVENTION

For connecting one mechanical component part to another mechanical component part, it has been a popular practice to use a positioning pin called "dowel pin" or "knock pin", as disclosed for example in Japanese Patent Application Laid-Open Publication No. HEI-3-170235 (hereinafter referred to as "the relevant patent literature").

FIG. 14 hereof is a view explanatory of a fundamental overall construction of a conventionally-known technique disclosed in the relevant patent literature. An engaging groove 102 is formed in one end portion of a workpiece in the form of a cam shaft 100 having a plurality of cams 101 provided thereon, and a center hole 103, a female threaded portion 104 and a pin hole 105 are formed in advance in another end portion of the cam shaft 100. A positioning pin 106 is press-fitted into the pin hole 105 by means of a pin press-fitting device 107 through the following steps.

Namely, first, the cam shaft 100 is set on a workpiece positioning apparatus by a locking claw 108 of a workpiece position apparatus being brought into engagement with the engaging groove 102. Then, a rotation shaft 109 of the workpiece positioning apparatus is rotated to align the pin hole 105 with the center of the pin press-fitting device 107; namely, the phases of the pin hole 105 and the pin press-fitting device 107 are matched. The pin press-fitting device 107 is operated to press-fit the positioning pin 106 into the pin hole 105. After that, a timing pulley 111 depicted by imaginary line is brought into contact with the other end of the cam shaft 100 while being aligned with the positioning pin 106 and a bolt 112 is screwed into the female threaded portion 104, so that the timing pulley 111 is fixed to the cam shaft 100. The timing pulley 111 is positioned relative to the cam shaft 100 by means of the positioning pin 106, so that predetermined phase relationship between the cams 101 and the timing pulley 111 can be maintained.

However, wobbles would undesirably occur due to a gap unavoidably left between the engaging groove 102 and the engaging claw 108. Because amounts of rotations of the rotation shaft 109 and the cam shaft 100 would differ due to the wobbles, it tends to be difficult to control the amounts of rotations.

Further, in case the press-fitting of the pin failed, it is necessary to find out what or where the problem is. However, there are a multiplicity of defect or inconvenience factors to be checked, such as wobbles but also a positional error of the engaging groove 102 relative to the pin hole 105 and an adjustment error of the positioning apparatus, and one inconvenience factor would influence another or others. Thus, it would be very difficult to find out a cause of the problem. As a consequence, a great number of steps would be required for addressing the problem, which could result in a long time of product line stoppage.

Further, because the phase of the engaging groove 102 relative to the pin hole 105 differs among models for design conveniences, there is a need to provide a separate press-fitting station per model of workpiece, and thus, necessary facilities would become large in size. Furthermore, because a space for installing additional press-fitting stations has to be secured in preparation of future addition of models of workpieces, which would even further increase a size of necessary facilities.

Because it is necessary to enhance a production efficiency, there has been a demand for a more sophisticated workpiece positioning apparatus which is capable of readily controlling an amount of rotation of the workpiece and easily taking an effective measure against an inconvenience.

SUMMARY OF THE INVENTION

In view of the foregoing prior art problems, it is an object of the present invention to provide an improved workpiece positioning apparatus which is capable of readily controlling an amount of rotation of the workpiece and easily taking an effective measure against an inconvenience, and which can handle many models of workpieces while avoiding size increase of necessary facilities.

In order to accomplish the aforementioned object, the present invention provides an improved workpiece positioning apparatus for positioning a workpiece when a pin is to be press-fit, by a press-fitting device, into a pin hole formed in advance in a cylindrical section of the workpiece, which comprises: a center movable toward the workpiece in such a manner that a distal end section of the center is introduced into the cylindrical section of the workpiece; and a projecting member accommodated in the center and movable into and out of the pin hole of the workpiece. With the distal end section of the center introduced in the cylindrical section of the workpiece, the projecting member projects through a through-hole formed in the center into engagement with the pin hole of the workpiece, and the projecting member is retracted from the pin hole when the pin is to be press-fitted into the pin hole by the press-fitting device.

According to the present invention, the projecting member is accommodated in the center and engageable with the pin hole formed in advance radially through the thickness of the cylindrical section of the workpiece. Because phase matching between the center and the workpiece is effected by the pin hole (into which the pin is to be press-fit) itself, the pin hole can be aligned with the press-fitting apparatus accurately with ease, and thus, the present invention can significantly increase the press-fitting accuracy. Even in case an inconvenience or trouble occurs during the press-fitting, the present invention effects the phase matching between the center and the workpiece by use of the pin hole itself. Thus, as compared to a case where a positioning groove etc. are provided separately, the present invention can decrease the number of defect or inconvenience factors to be checked, so that the present invention can not only readily take a measure for addressing the inconvenience but also readily adjust the positioning apparatus.

If the phases of the center and the workpiece are matched by use of an engaging groove etc. a press-fitting station has to be provided per model of workpiece, as in the above-discussed conventionally-known technique. However, in the case where the phases of the center and the workpiece are matched by the pin hole itself, the pin press-fitting can be performed on many models of workpieces by user of only one press-fitting station. As a result, the present invention can avoid size increase of the workpiece positioning apparatus and significantly facilitate retooling operations necessary at the time of a model change.

In an embodiment, the workpiece positioning apparatus further comprises a pivotal movement control section that pivots the center, with the distal end section of the center introduced in the cylindrical section of the workpiece, to cause the projecting member to project into the engagement with the pin hole and then pivots the center to a phase where the projecting member and the press-fitting member are opposed to each other. As the center is pivoted the the pivotal movement control section after the projecting member has been caused to project into the engagement with the pin hole, the workpiece pivots together with the center by being pressed by the projecting member held in the engagement with the pin hole. Thus, the workpiece can be rotated directly via the projecting member. Because such an arrangement of the present invention allows amounts of rotation of the center and the workpiece to match each other, the present invention can provide an improved workpiece positioning apparatus which can readily control the amount of rotation of the workpiece and readily take a measure against any inconvenience.

In an embodiment, the workpiece positioning apparatus of the present invention further comprises a driving member connected at one end with the projecting member for moving the projecting member relative to the workpiece, and the driving member is accommodated in the center. Because the driving member for moving the projecting member is accommodated in the center, the driving member does not project from the center although the driving member is a moving member, and thus, the center has an improved external shape.

In an embodiment, the driving member is pivotably mounted on the center via a pivot shaft, and a distance from the pivot shaft to another end of the driving member is set greater than a distance from the one end of the driving member to the pivot shaft, and the workpiece positioning apparatus further comprises a sensor that detects movement of the other end of the driving member. By such leverage, an amount of movement of the other end is greater than an amount of movement of the one end. Because the amount of movement at the other end is greater, the amount movement of the other end can be detected by the sensor that has a not-so-good detection accuracy. Thus, an inexpensive sensor can be employed as the sensor.

In an embodiment, the one end of the driving member is connected to the projecting member by means of a hinge, and the projecting member is vertically movable relative to the workpiece by the driving member pivoting about the pivot shaft. By action of the hinge, arcuate pivotal movement of the driving member can be converted into linear movement which can promote linear movement of the projecting member.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

Figure 1:
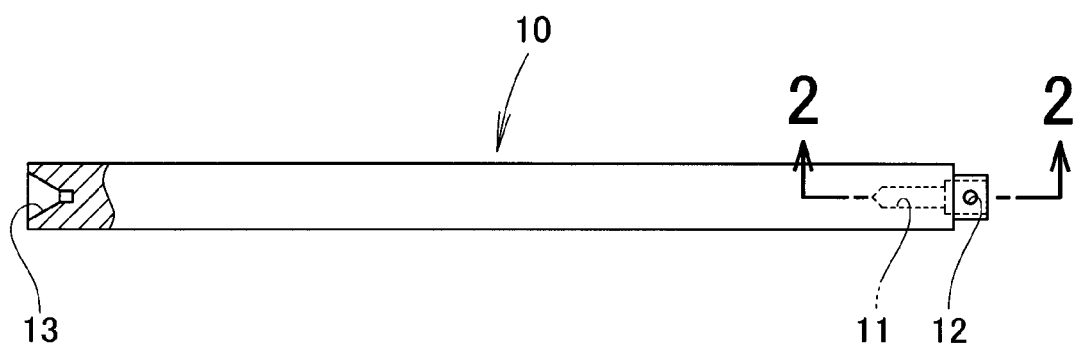
FIG. 1 is a view showing one form of workpiece to be worked on by an embodiment of a workpiece positioning apparatus of the present invention.

FIG. 1 shows one example of a workpiece to be worked on or handled by an embodiment of a workpiece positioning apparatus 20 of the present invention. As shown in FIG. 1, the workpiece 10 is a rod-shaped workpiece, such as a counterbalance shaft, having a first center hole 11 and a pin hole 12 at one end and a second center hole 13 at the other end.

Figure 2:
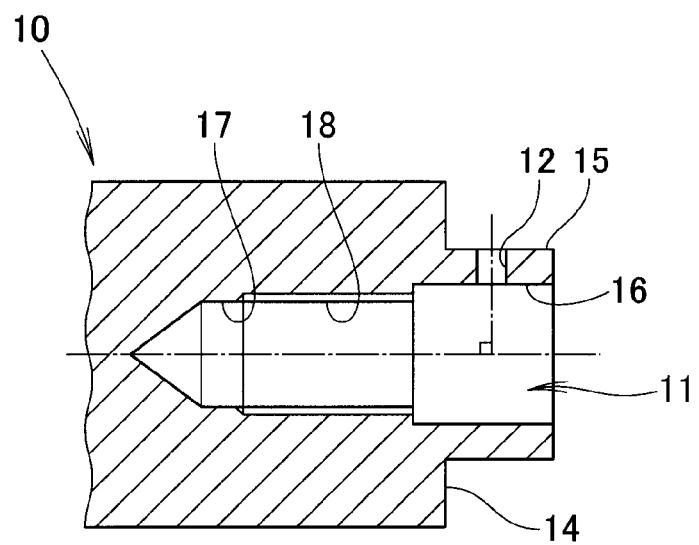
FIG. 2 is a sectional view taken along line 2-2 of FIG. 1.

As shown in FIG. 2, the workpiece 10 includes an annular end surface 14 extending perpendicularly to the axis of the workpiece 10, and a cylindrical section 15 extending in an axial direction of the workpiece 10 from the inner peripheral portion of the annular end surface 14 to the axial end of the workpiece 10. The pin hole 12 is formed in advance radially through the thickness of the cylindrical section 15, and the axis of the pin hole 12 lies perpendicularly to the longitudinal axis of the workpiece 10.

The first center hole 11 comprises a cylindrical hole 16 extending in the axial direction of the workpiece 10, an inner hole 17 having a smaller diameter than the cylindrical hole 16 and extending in the axial direction of the workpiece 10, and a female threaded portion 18 formed in the inner peripheral surface of the inner hole 17.

Figure 3:
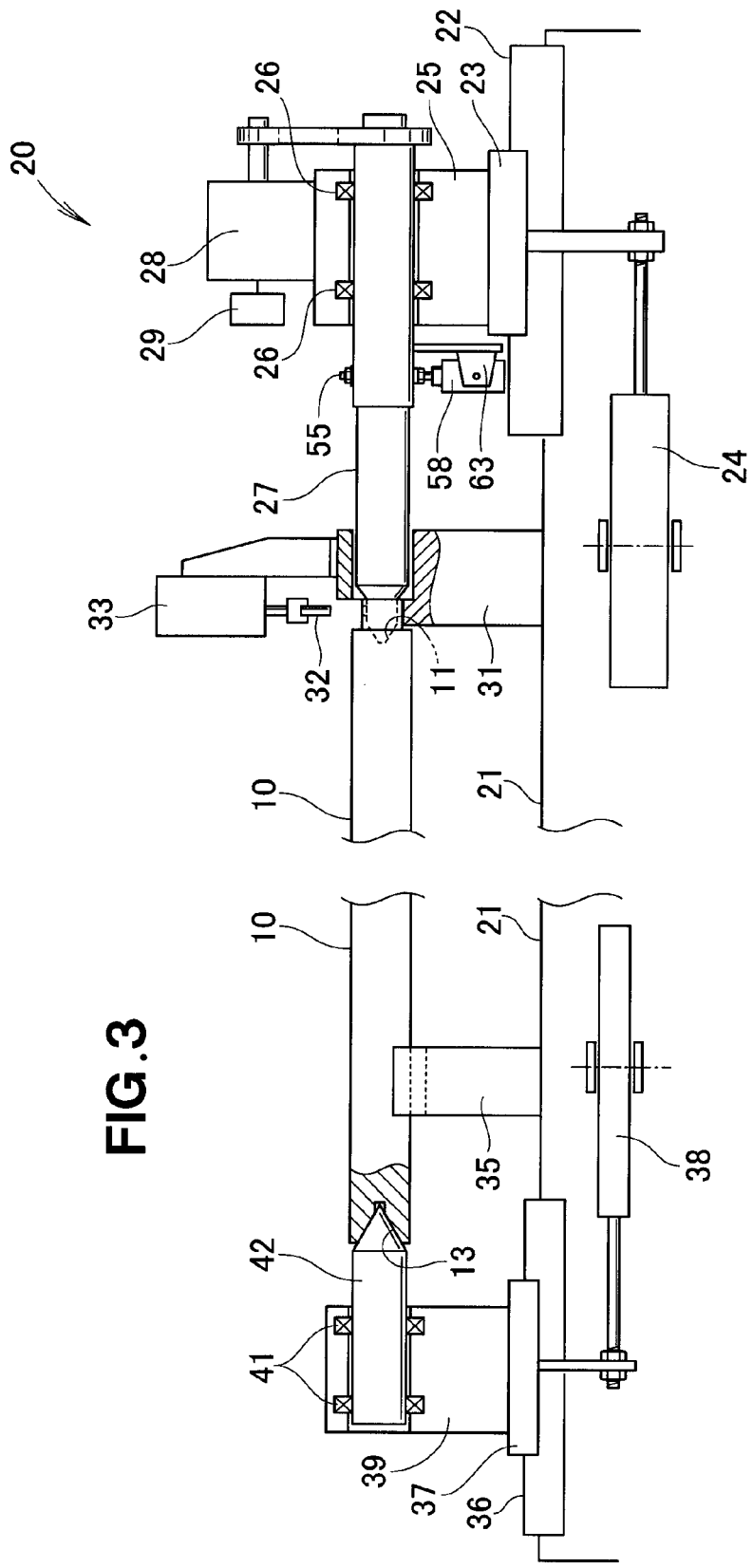
FIG. 3 is a view showing an overall construction of the embodiment of the workpiece positioning apparatus of the present invention.

As shown in FIG. 3, the embodiment of the workpiece positioning apparatus 20 includes: a machine bed 21; a first slider 23 horizontally movably mounted on a first rail 22 laid on the machine bed 21; a first movement section 24 for moving the first slider 23 along the rail 22; a first bearing stand 25 provided on the first slider 23; a first center 27 horizontally and rotatably mounted on the first bearing stand 25 via first bearings 26; a pivotal movement control section (or means) 28 provided on the first bearing stand 25 for rotating the first center 27; a rotation sensor 29 connected to the pivotal movement control section (or means) 28 for measuring an amount of rotation of the first center 27; a first provisional support stand 31 provided on the machine bed 21 for provisionally supporting one end portion of the workpiece 10; a press-fitting device 33 provided on the machine bed 21 and having a pin 32 with its axis oriented in a vertical direction; a second provisional support stand 35 provided over the machine bed 21 for provisionally supporting another end portion of the workpiece 10; a second slider 37 horizontally movably mounted on a second rail 36 laid on the machine bed 21; a second movement section 38 for moving the second slider 37 along the rail 36; a second bearing stand 39 provided on the second slider 37; and a second center 42 horizontally and rotatably mounted on the second bearing stand 39 via second bearings 41.

The workpiece 10 is provisionally set on the first and second provisional support stands 31 and 35. Then, the first center 27 is advanced to fit into the first center hole 11 of the workpiece 10, while simultaneously the second center 42 is advanced to fit into the second center hole 13 of the workpiece 10. Thus, the workpiece 10 floats up from the first and second provisional support stands 31 and 35 by the conical surfaces of the centers 27 and 42 (i.e., taper action of the centers 27 and 42), so that the workpiece 10 is sandwiched between the first and second centers 27 and 42.

Figure 4:
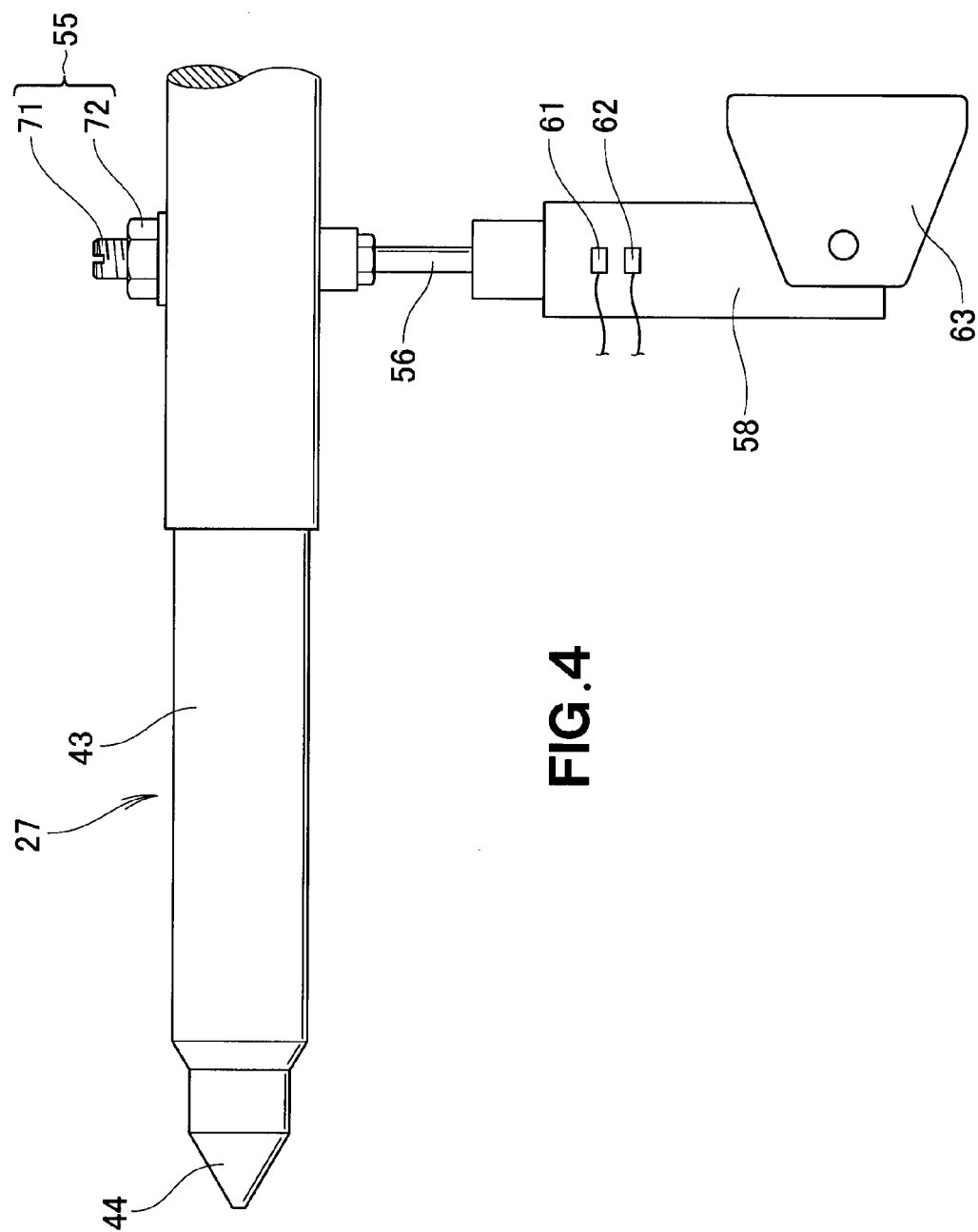
FIG. 4 is a side view of a first center employed in the embodiment of the workpiece positioning apparatus.

As shown in FIG. 4, the first center 27 has a cylindrical columnar section 43 and a conical section (or distal end section) 44 formed integrally with the distal end of the circular columnar section 43, of which the conical section (distal end section) 44 engages the first center hole 11.

Figure 5:
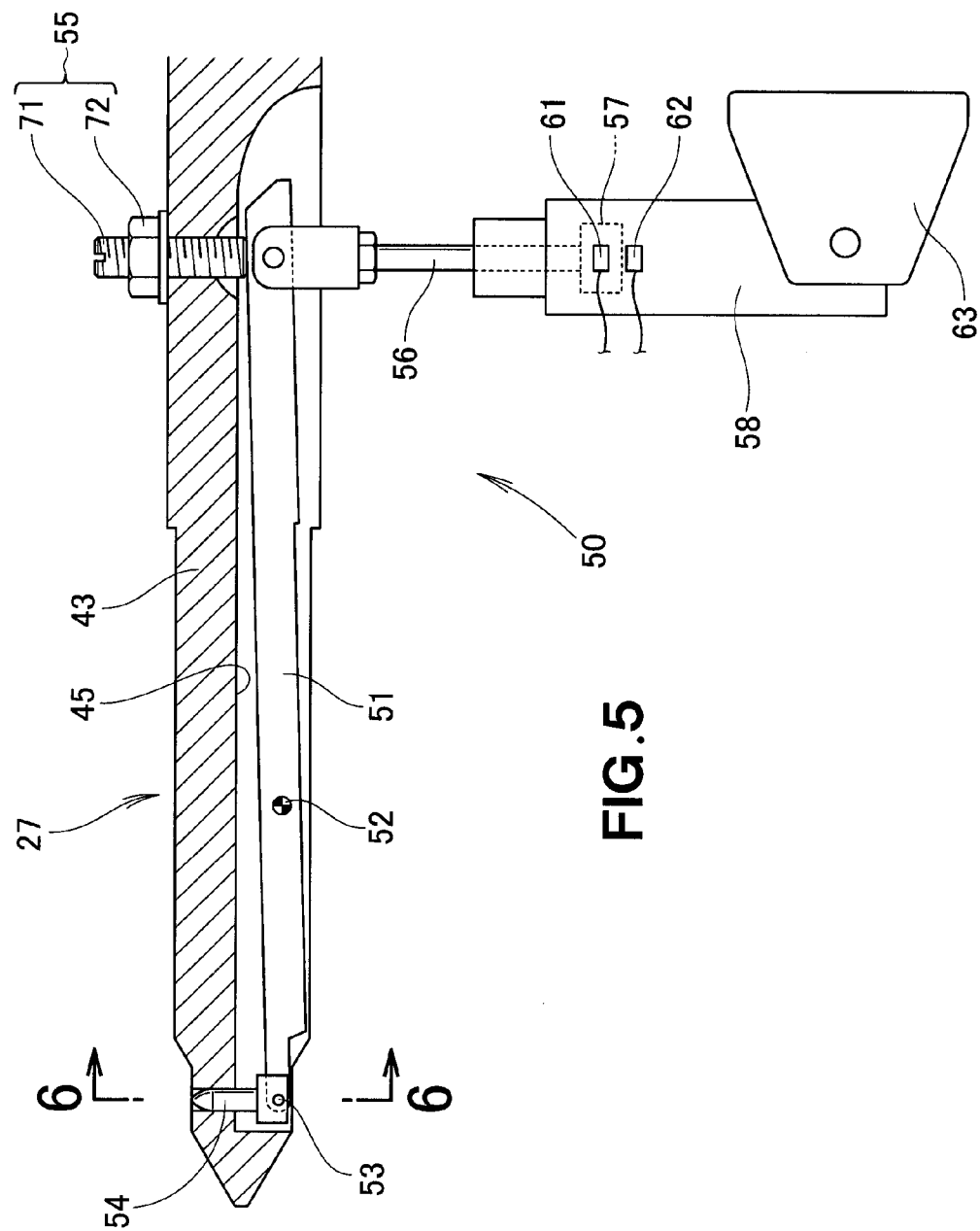
FIG. 5 is a view explanatory of a construction of a projecting member movement section provided in the first center.

Further, as shown in FIG. 5, the first center 27 has an axial groove 45. The first center 27 includes a projecting member movement mechanism 50 by having principal sections of the projecting member movement mechanism 50 accommodated in the axial groove 45.

The projecting member movement section 50 includes: a driving member 51 of a lever or bar shape accommodated in the groove 45; a pivot shaft 52 pivotably connecting the drive member 51 to the first center 27; a hinge 53 rotatably mounted at the distal end (one end) of the driving member 51; a projecting member 54 connected to the hinge 53 and projecting upward; an upper stopper 55 mounted on the first center 27 and defining an upper limit position of a base portion of the driving member 51; and an air cylinder 58 connected to the base portion of the driving member 51 including a piston rod 56 extending downward with a piston 57 provided at a lower end portion thereof.

The air cylinder 58 includes upper and lower sensors 61 and 62 for detecting the piston 57, and the air cylinder 58 is connected to the body of the first center 27 via a bracket 63 as shown in FIG. 3.

Figure 6:
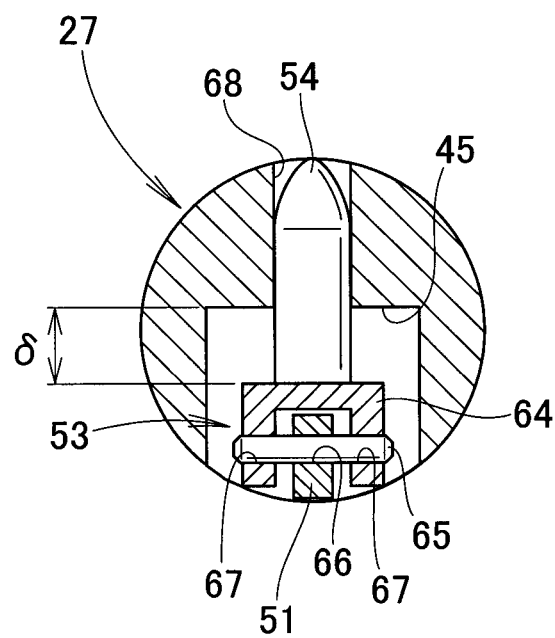
FIG. 6 is a sectional view taken along line 6-6 of FIG. 5.

Further, as shown in FIG. 6, the hinge 53 includes a fork member 64 supporting the projecting member 54, and a connection shaft 65 connecting the fork member 64 and the driving member 51. At least one of a hole formed in the driving member 51 for passage therethrough of the connection shaft 65 and holes 67 formed in the folk member 64 for passage therethrough of the connection shaft 65 is an elongated hole(s) extending in the axial direction (i.e., in a direction intersecting the sheet of FIG. 6).

The projecting member 54 is accommodated in a through-hole 68 formed in the first center 27 in such a manner that it is movable vertically (in an up-down direction) along the inner peripheral surface of the through-hole 68. Namely, the projecting member 54 is movable into and out of the pin hole 12 through the through-hole 68 formed in the first center 27. The folk member 64 is movable upward within the groove 45 by a distance corresponding to a vertical gap δ.

Figure 7:
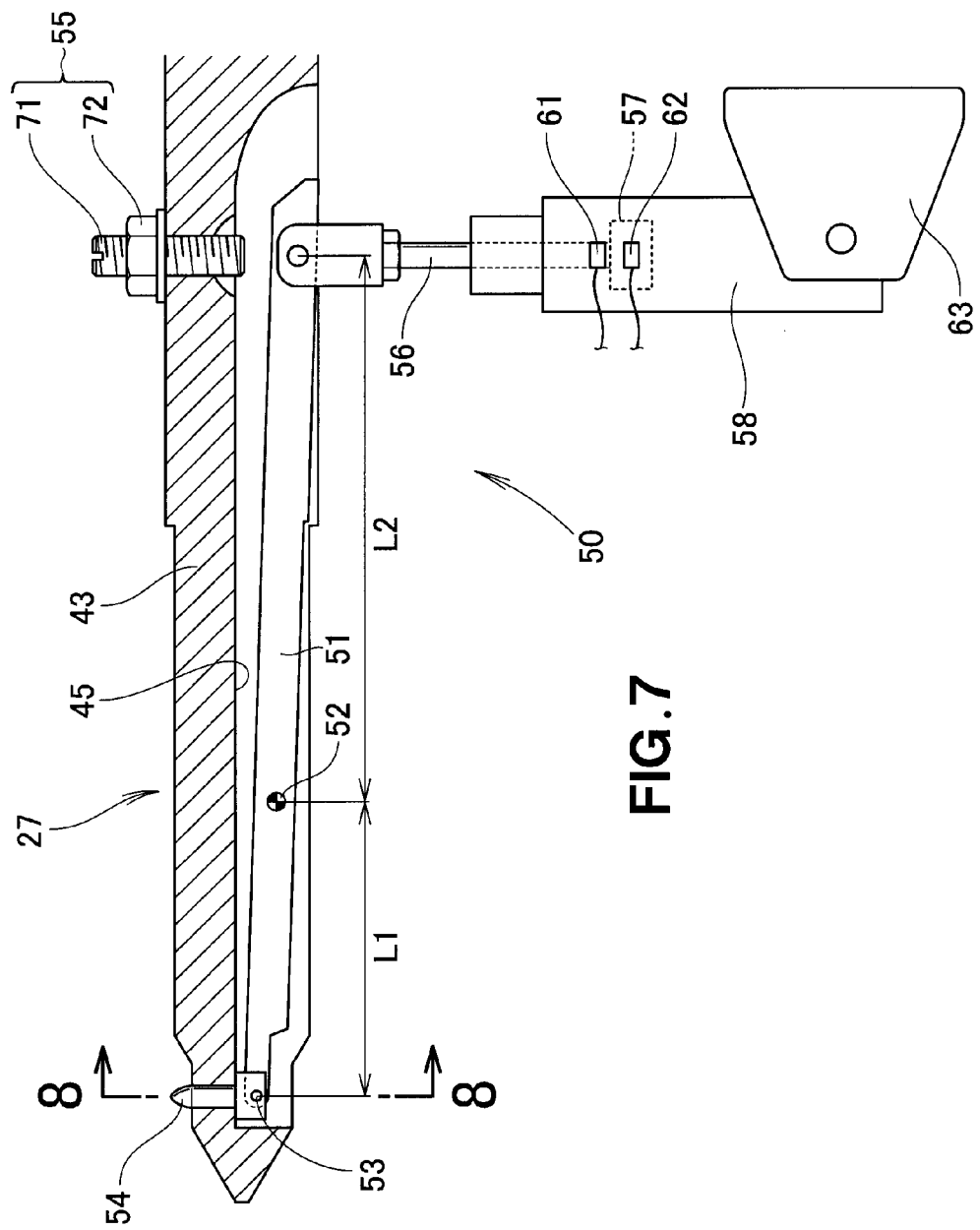
FIG. 7 is a view explanatory of the projecting member movement section.

Further, as shown in FIG. 7, the base portion of the driving member 51 descends as the piston 57 of the air cylinder 58 is retracted or descends. Thus, the driving member 51 pivots about the pivot shaft 52 so that the one end of the driving member 51 moves upward or ascends. The descending movement of the piston 57 is detected by the lower sensor 62.

Figure 8:
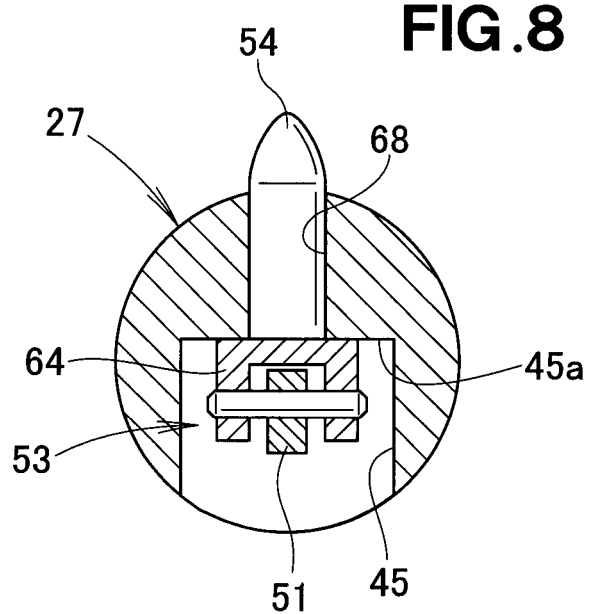
FIG. 8 is a sectional view taken along line 8-8 of FIG. 7.

Further, as shown in FIG. 8, as the one end of the driving member 51 ascends, an upper end portion of the projecting member 54 ascends upward above the upper surface of the first center 27. At that time, the fork member 64 abuts against the bottom surface 45a of the groove 45, upon which the ascending movement of the driving member 51 is terminated.

In the illustrated example of FIG. 7, a distance L2 from the pivot shaft 52a to the piston rod 56 is set greater than a distance L1 from the hinge 53 to the pivot shaft 52; more specifically, in this example, relationship of "L1:L2=1:2" is established. Thus, an amount of movement of the piston 57 is about twice (i.e., L2/L1 times) as much as an amount of movement of the projecting member 54.

Preferably, the body of the air cylinder 58 is formed of non-magnetic material, while the piston 57 is formed of magnetic material. In such a case, proximity switches for detecting the magnetic material can be used as the upper and lower sensors 61 and 62. Although detection accuracy of the proximity switches are not so good because the proximity switches are constructed to detect presence/absence of variation in a magnetic field, the proximity switches are available at low price. Because the amount of movement of the piston 57 is doubled, i.e. twice as much as the amount of movement of the projecting member 54 as noted above, proximity switches having not-so-good detection accuracy can be employed, and thus, it is possible to minimize cost increase of the apparatus.

The upper stopper 55 comprises a bolt 71 screwed through the circular columnar section 43 of the first center 27 in such a manner that it passes through the circular columnar section 43 until its lower end portion projects into the groove 45, and a nut 72 for preventing loosening of the bolt 71. An amount of projection, into the groove 45, of the bolt 71 is adjustable by rotation of the bolt 71, but such an amount of projection would vary depending on who adjusts the bolt 71 (or due to a difference among various persons adjusting the bolt 71). However, because the amount of movement of the piston 57 is doubled as noted above, the bolt 71 having a not-so-good positioning accuracy can be employed in the embodiment. Besides, the bolt 71 and the nut 72 are inexpensive.

Figure 9:
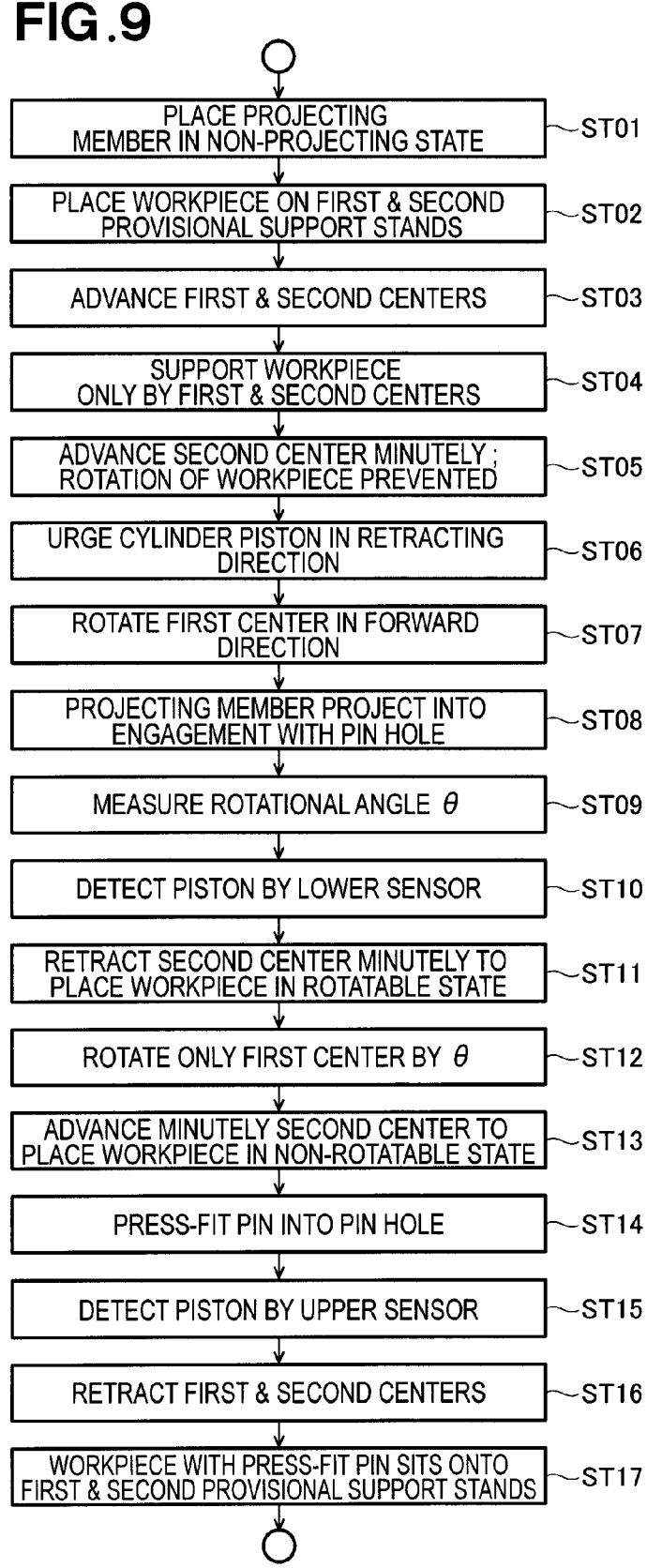
FIG. 9 is a flow chart explanatory of steps performed from input of a workpiece to pin press-fitting into the workpiece.

The following describe, with primary reference to FIG. 9, behavior of the workpiece positioning apparatus 20 constructed in the above-described manner.

At step ST01 of FIG. 9, the first and second centers 27 and 42 are placed in their respective standby positions, and the projecting member 54 is placed in a non-projecting state. Namely, the first center 27 is placed in a state shown in FIGS. 5 and 6.

Then, at step ST02, the workpiece 10 is placed on the first and second provisional support stands 31 and 35 with the pin hole 12 angularly moved or displaced about 10 degrees from a predetermined vertically-upward reference position corresponding to a press-fitting position. Then, the first and second centers 27 and 42 are advanced to the workpiece 10. Thus, the first and second centers 27 and 42 float up from the first and second provisional support stands 31 and 35 and are supported only by the first and second centers 27 and 42, at step ST04.

Figure 10:
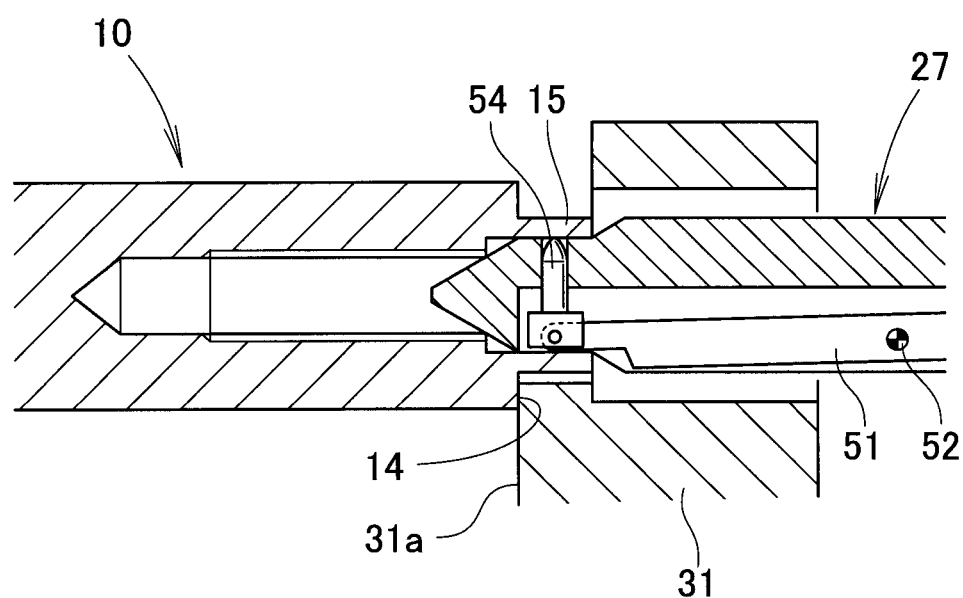
FIG. 10 is a view supplementary to explanation of step ST05.

Then, the second center 42 continues to be advanced minutely at step ST05. Then, as shown in FIG. 10 that is supplementary to the explanation of step ST05, the annular end surface 14 of the workpiece 10 is pressed against the front surface 31a of the first provisional support stand 31. Thus, frictional force occurs between the annular end surface 14 and the front surface 31a and prevents rotation of the workpiece 10. Note that the pin hole 12 is not visible in FIG. 10 because, in FIG. 10, the pin hole 12 is at the position angularly displaced about 10 degrees from the predetermined vertically-upward reference position.

Then, at step ST06, the piston 57 of the air cylinder 58 is urged in a retracting direction by high-pressure air being supplied a space located immediately over the piston 57.

Figure 11A:
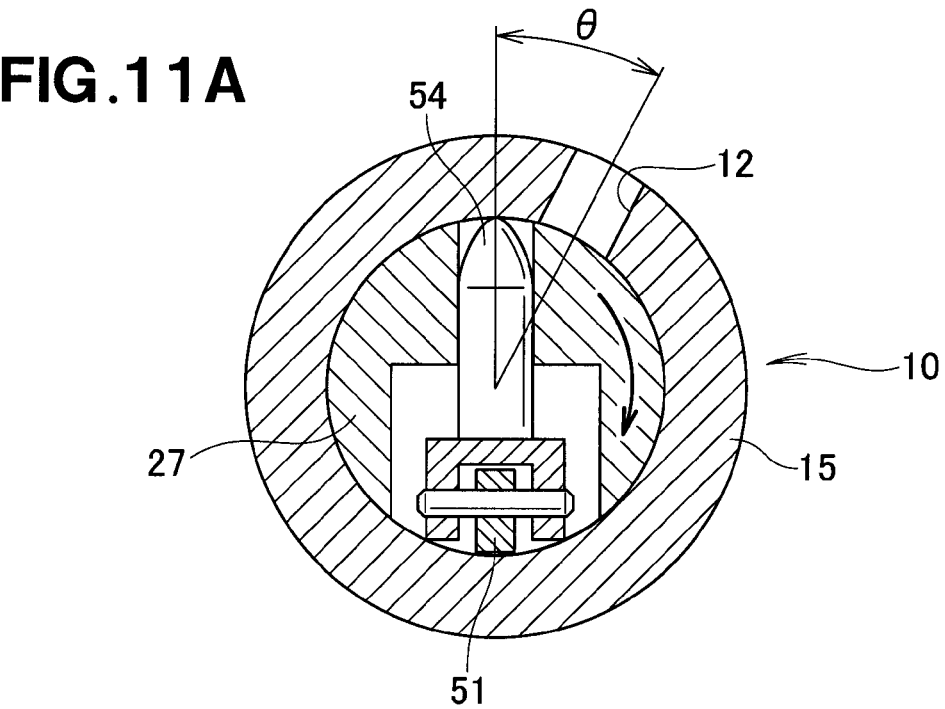
FIG. 11A is a view supplementary to explanation of steps ST06 to ST08.

As shown in FIG. 11A that is supplementary to the explanation of steps ST06 to ST08, ascending movement of the projecting member 54 is prevented by the distal end of the projecting member 54 abutting against the inner peripheral surface of the cylindrical section 15.

At step ST07, the first center 27 is rotated in a forward direction. Namely, the first center 27 is rotated in a forward direction, i.e. in a clockwise direction in FIG. 11A, with the cylindrical section 15 kept stationary as shown in FIG. 11A. Once the first center 27 is rotated about 10 degrees in the clockwise direction, the projecting member 54 positionally coincides with, or aligns with, the pin hole 12, upon which the projecting member 54 projects into engagement with the pin hole 12 at step ST08 because the projecting member 54 is normally urged in the projecting direction by the air cylinder 58. the current rotational angle θ of the first center 27 is measured at step ST09 by the rotation sensor 29 shown in FIG. 3.

Completion of the engagement of the projecting member 54 with the pin hole 12 is confirmed by the position of the piston 57 being detected by the lower sensor 62 at step ST10. The operations at steps ST06 to ST10 have been performed with the workpiece 10 maintained in a non-rotatable state. Because the pin hole 12 has been angularly displaced by the angle θ from the vertically-upward reference position whereas the press-fitting device is disposed immediately above the vertically-upward reference position, it is necessary to rotate the workpiece 10.

Figure 11B:
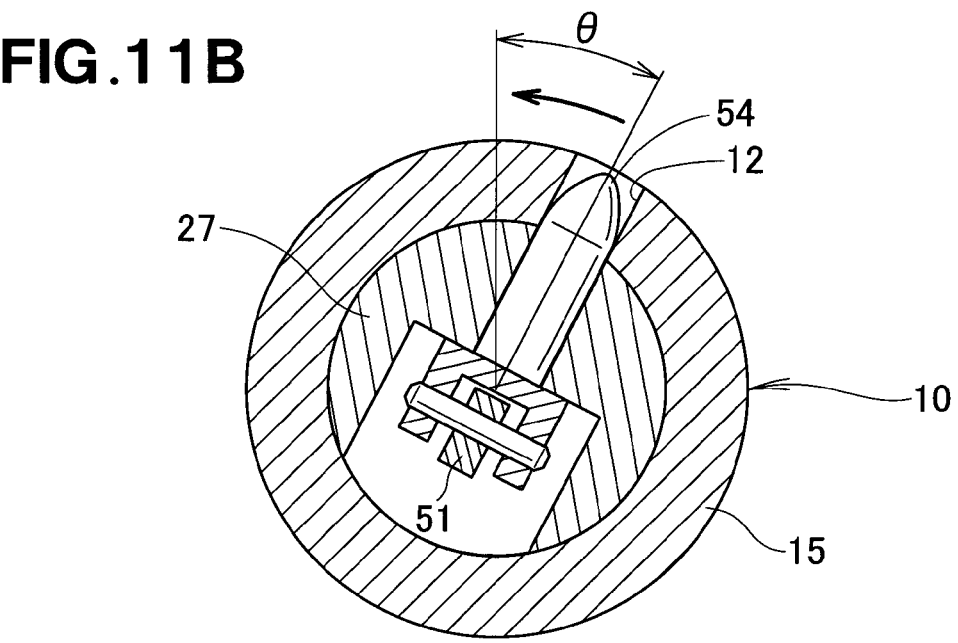
FIG. 11B is a view supplementary to explanation of step ST12.

Then, at step ST11, the second center 42 is retracted minutely to place the workpiece 10 in a rotatable state. Then, at step ST12, the first center 27 is rotated via the pivotal movement control section (means) 28 by the angle θ in a reverse or counterclockwise direction as shown in FIG. 11B. Because the projecting member 54 is held in fitting engagement with the pin hole 12, the cylindrical section 15 of the workpiece 10 pivots together with the first center 27 by being pressed by the projecting member 54, so that the pin hole 12 is positioned at the vertically-upward reference position. In this way, the projecting member 54 and the press-fitting device 33 have been brought to a phase where they are opposed to each other.

Figure 12:
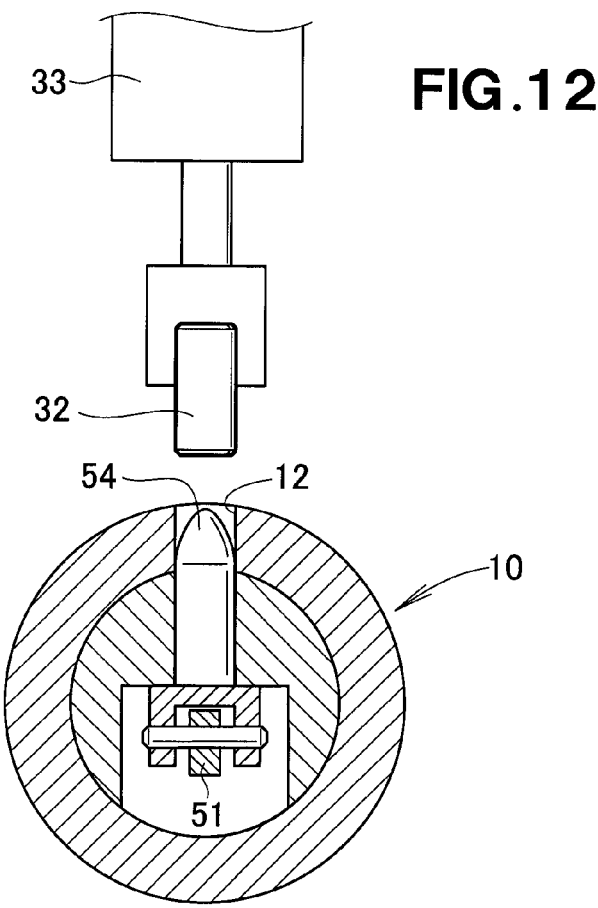
FIG. 12 is a view supplementary to explanation of step ST14.

Then, it is necessary to place the workpiece 10 in the non-rotatable state in preparation for a next operation. For this purpose, the second center 42 is advanced minutely to place the workpiece 10 in the non-rotatable state, at step ST13. Consequently, the workpiece 10 is placed in a state as shown in FIG. 12, where the pin hole 12 and the projecting member 54 are accurately aligned with the axis line of the press-fitting device 33. Because the workpiece 10 is now in the non-rotatable state, the pressing direction of the air cylinder is reversed so that the pin 32 descends.

Figure 13:
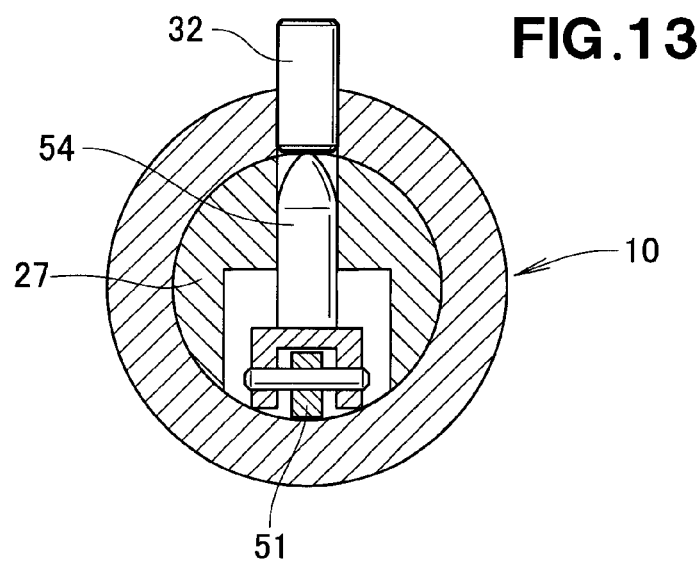
FIG. 13 is a view supplementary to explanation of step ST14.
Figure 14:
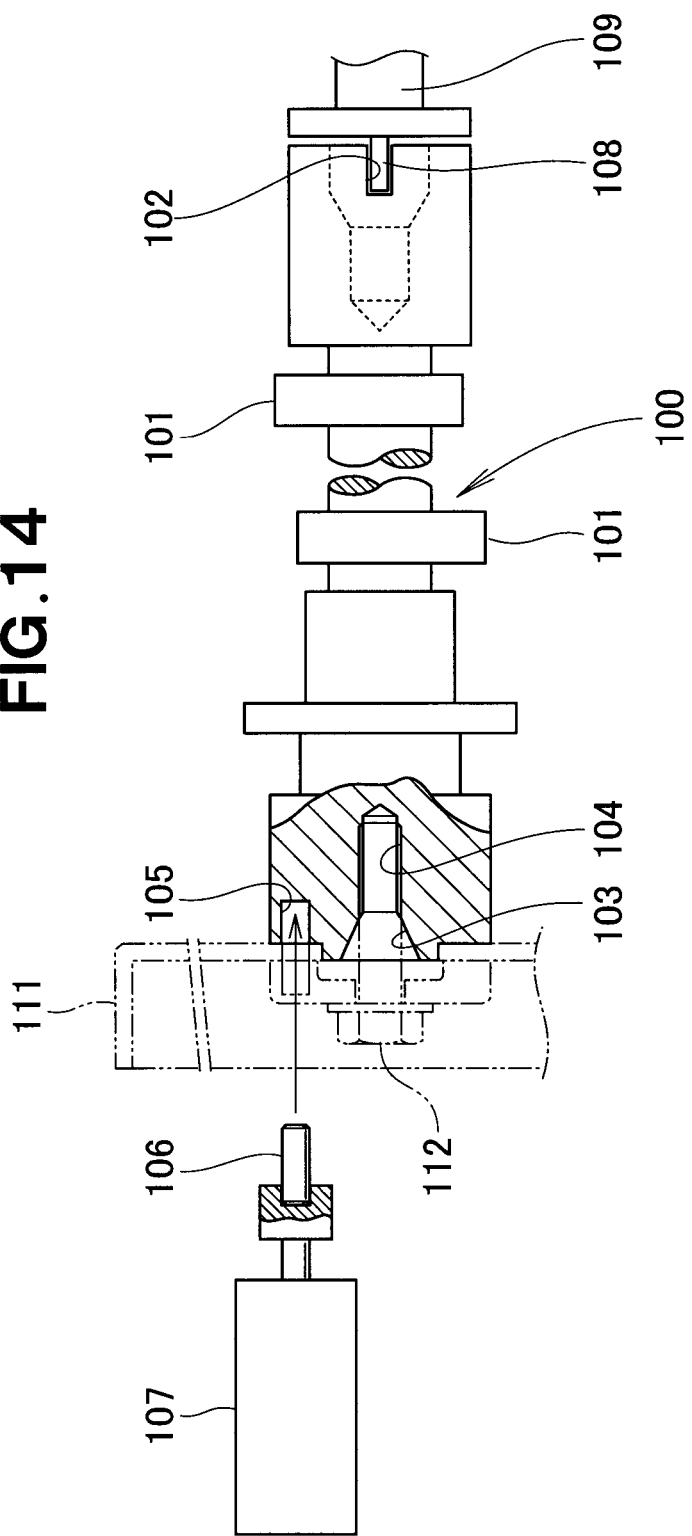
FIG. 14 is a view explanatory of a fundamental construction of a conventionally-known technique.

As the pin 32 is inserted into the pin hole 12 in the state of FIG. 12, the projecting member 54 is pressed by the pin 32, and thus, the projecting member 54 descends to a standby position as shown in FIG. 13. The press-fitting device 33 press-fits the pin 32 into a preset depth.

That the pin 32 has been accurately press-fit into the pin hole 12 can be detected by detecting that the projecting member 54 has descended. Thus, the pin 32 is press-fit into the pin hole 12 at step ST14, and the current position of the piston 57 of the air cylinder 58 is detected by the upper sensor 61 at step S15. That the press-fitting of the pin 32 has been completed is confirmed by such detection of the current position of the piston 57.

After that, the first and second centers 27 and 42 are retracted at step S16, upon which the workpiece 10 with the press-fit pin 32 sits onto the first and second provisional support stands 31 and 35 at step ST17.

In the aforementioned manner, a series of steps for press-fitting the pin 32 into the workpiece 10 can be completed.

Because the pivotal movement control section (means) 28 and the first center 27 are connected mechanically as shown in FIG. 3, no wobbles would occur between the pivotal movement control section 28 and the first center 27, and thus, the rotational angle of the first center 27 can be measured accurately by the rotation sensor 29. In a case where the advancing and retracting movement of the first and second centers 27 and 42 and the pivoting movement of the first center 27 are subjected to NC control, it is possible to handle many models of workpieces by changing NC data. Thus, necessary retooling operations can be facilitated, but also a size of necessary facilities can be reduced because only one press-fitting station is required in the instant embodiment. Besides, adjustment of the facilities can be made in accordance with numerical value inputs.

It is assumed that repeated press-fitting operations would cause a trouble that the pin 12 cannot be press-fit into the pin hole 12 in the state shown in FIG. 12. For example, if the pin hole 12 cannot be positioned in the predetermined vertically-upward reference position, i.e. if the movement of the projecting member 54 and the movement of the press-fitting device 33 are inconsistent with each other, it is conceivable that such a trouble has occurred due to malfunction or error of the pivotal movement control section 28 and the rotation sensor 29. Thus, the pivotal movement control section 28 and the rotation sensor 29 are checked and adjusted as necessary. Further, if the axis of the pin 32 has become slanted, it is conceivable that the press-fitting device 33 has been displaced from the predetermined position, and thus, the press-fitting device 33 is adjusted as necessary.

In the present invention, as apparent from the foregoing, the respective phases of the first center 27 and the workpiece 10 are matched with each other by the pin hole 12 (into which the pin is to be press-fit) itself. Thus, the pin hole 12 can be aligned with the press-fitting apparatus 33 accurately with ease, so that the press-fitting accuracy can be increased. Namely, because the first center 27 has accommodated therein the projecting member 54 that can project from the inner peripheral side of the workpiece 10, and the phase matching can be effected by the pin hole 12 itself although the workpiece 10 is supported at its opposite ends by the centers 27 and 42. Even in case a trouble occurs during the press-fitting, it is possible to not only readily take an appropriate measure for addressing that trouble, but also adjust the positioning apparatus with ease.

Furthermore, the workpiece positioning apparatus of the present invention is well suited for application to positioning of workpieces, such as counterbalance shafts and camshafts. Note, however, that the workpieces to be handled by the present invention may be of any types and forms as long as the workpieces have a pin hole formed in their cylindrical section. Further, the sensor for detecting movement of the other end of the driving member may be other than the proximity switch, such as a mechanical limit switch for directly detecting the other end of the driving member 54 or an optical switch for indirectly detecting the other end of the driving member 54. Such a sensor for detecting movement of the other end of the driving member may be of any desired type, form and mounting configuration.

What is claimed is:

1. A workpiece positioning apparatus for positioning a workpiece when a pin is to be press-fitted, by a press-fitting device, into a pin hole formed in advance in a cylindrical section of the workpiece, the apparatus comprising:
a central cylinder movable toward the workpiece in such a manner that a distal end section of the central cylinder is introduced into the cylindrical section of the workpiece; and a projecting member accommodated in the central cylinder and movable into and out of the pin hole of the workpiece,
wherein, with the distal end section of the central cylinder introduced in the cylindrical section of the workpiece, the projecting member projects through a through-hole formed in the central cylinder into engagement with the pin hole of the workpiece, and the projecting member is retracted from the pin hole when the pin is to be press-fitted into the pin hole by the press-fitting device,
wherein an axis of the through-hole lies perpendicularly to a longitudinal axis of the central cylinder,
wherein a driving member accommodated in the central cylinder is connected at one end with the projecting member for moving the projecting member relative to the workpiece.

2. The workpiece positioning apparatus according to claim 1, which further comprises a pivotal movement control means that pivots the central cylinder, with the distal end section of the central cylinder introduced in the cylindrical section of the workpiece, to cause the projecting member to project into the engagement with the pin hole and then pivots the central cylinder to a phase
where the projecting member and the press-fitting device are opposed to each other, and
wherein, as the central cylinder is pivoted by the pivotal movement control means after the projecting member has been caused to project into the engagement with the pin hole, the workpiece pivots together with the central cylinder by being pressed by the projecting member held in the engagement with the pin hole.

3. The workpiece positioning apparatus according to claim 1, wherein the driving member is pivotably mounted on the central cylinder via a pivot shaft, and a distance from the pivot shaft to another end of the driving member is set greater than a distance from the one end of the driving member to the pivot shaft, and
which further comprises a sensor that detects movement of the other end of the driving member.

4. The workpiece positioning apparatus according to claim 3, wherein the one end of the driving member is connected to the projecting member by means of a hinge, and the projecting member is caused to project through the through-hole of the central cylinder by the driving member pivoting about the pivot shaft.

* * * * *